Jan. 14, 1958  C. E. SCHMIDT  2,819,538
HYDROSTATIC LEVEL
Filed Dec. 23, 1953  2 Sheets-Sheet 1
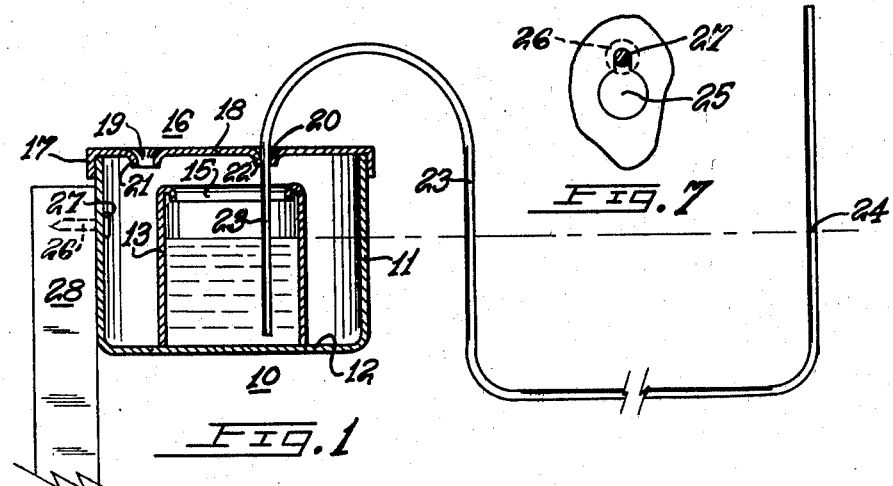
Fig.1
Fig.7
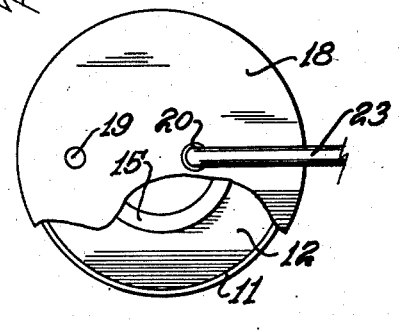
Fig.2
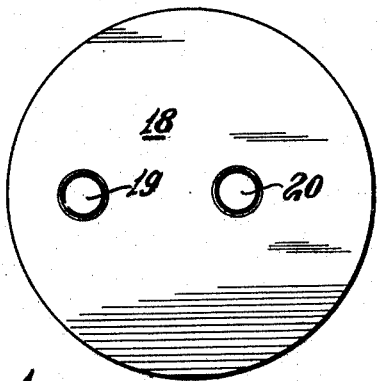
Fig.4
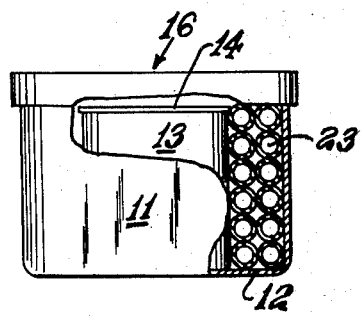
Fig.3
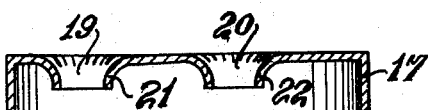
Fig.5
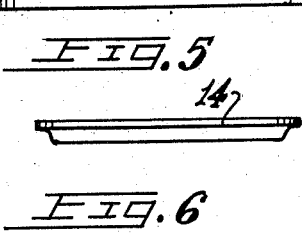
Fig.6
INVENTOR.
CHARLES E. SCHMIDT
BY
Wilkinson & Mawhinney
Attorneys Jan. 14, 1958  C. E. SCHMIDT  2,819,538
HYDROSTATIC LEVEL
Filed Dec. 23, 1953  2 Sheets-Sheet 2

INVENTOR.
CHARLES E. SCHMIDT
BY
Wilkinson Mawhinney
Attorneys

# United States Patent Office 2,819,538
Patented Jan. 14, 1958

2,819,538

HYDROSTATIC LEVEL

Charles E. Schmidt, Ocean Springs, Miss.

Application December 23, 1953, Serial No. 400,047

2 Claims. (Cl. 33—209)

The present invention relates to an improvement in a hydrostatic level and has for an object to provide an accurate, durable and portable device for extending a level line based on the principle that a liquid rises to the level of its source.

Another object of the present invention is to provide a reservoir in connection with the hydrostatic tube, making the device operable by one person, thus effecting a saving in labor and reducing the probability of error, and also making possible the extending of a level line almost twice the distance of the tube length.

A further object of the present invention is to provide an improved structure in which a cylindrical reservoir is concentric with and enclosed by a larger cylindrical container thus providing an annular stowage for the hydrostatic tube when not in use, and thereby achieving a compactness which enhances the utility of the level.

A still further object of the present invention is to provide a simplified structure in which the components are for the most part cylindrical in shape and adapted to mass production, and a structure in which all non-essential parts are eliminated, thus reducing the cost to a minimum and encouraging the widespread use of a highly dependable leveling device with flexibility and simplicity of operation especially suited to construction work.

In the drawings, wherein like symbols refer to like or corresponding parts throughout the several views, Figure 1 is a vertical section of an improved hydrostatic level constructed according to the present invention.

Figure 2 is a top plan view of the level of Figure 1 with parts broken away.

Figure 3 is a side elevational view with parts broken away on the level of Figure 1 with the hydrostatic tube coiled about the reservoir.

Figure 4 is a top plan view taken on an enlarged scale of the cover for the level.

Figure 5 is a vertical sectional view taken on an enlarged scale of the container cover employed with the level of Figure 1.

Figure 6 is a side elevational view of the reservoir cover for the form of the invention illustrated in Figure 1.

Figure 7 is a fragmentary rear elevational view of the outer container showing the reference point attaching means.

Figure 8:
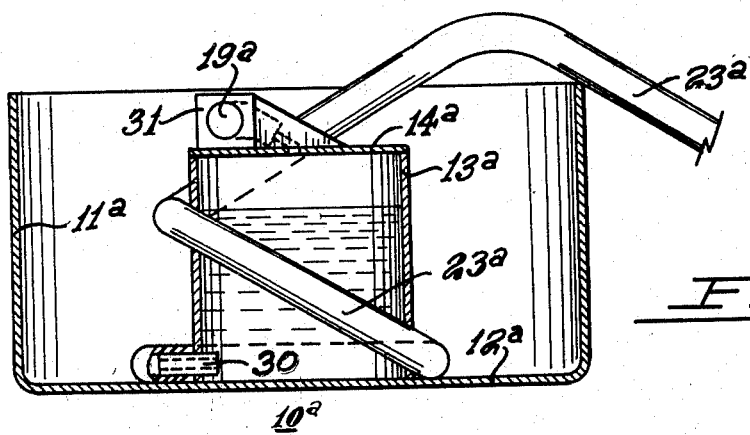
Figure 8 is a vertical sectional view of a modified form of level constructed according to the present invention.

Referring to the drawings 10 designates generally a container having an annular wall 11 and bottom 12. Situated within the container concentrically with respect to the annular wall 11 is a cylindrical reservoir 13. This reservoir may be cast integral with or fastened to the bottom 12 of the container. The reservoir 13 is of lesser height than the annular wall 12 to permit the reservoir to be sealed during transit by a cover 14 which frictionally seats around the lip 15 of the top of the reservoir.

Receivable over the container 10, after placement of the reservoir cover 14, is a container cover 16. This cover 16 is of the friction type having an annular flange 17 depending from the top plate 18. There are two openings 19 and 20 through the top plate 18 of the cover which may be punched or struck during their formation leaving resilient gripper flanges 21, 22. Receivable through either of the holes 19, 20 is a length of transparent hydrostatic tube 23, flexible and preferably compressible, of a diameter slightly greater than the diameter of the openings 19, 20 whereby the gripper flanges 21 or 22 will frictionally bind against the outer wall of the tube 23 to retain the same in place. As shown in Figure 1, the tube 23 in leveling has one of its ends immersed in a liquid in reservoir 13, while its other end is employed for leveling. The leveling end of the tube 23 has a datum or reference line 24 circumscribed thereabout.

The liquid in the reservoir 13 may be colored to cooperate with the transparency of the tube 23 thereby facilitating detection of air voids in the tube. The reservoir 13 and container 10 may be constructed of a transparent material to permit visual perception during transportation to assure the presence of the coiled hydrostatic tube and to assure the presence of a liquid in the reservoir.

For operating the level where no suitable supporting surface is available, an attaching means for the container is provided. This means may consist of an inverted key hole slot 25 through the wall 11 of the container 10. The larger opening of the slot 25 receives a nail or screw head 26 therethrough and the smaller opening accommodates the shank 27 thereof whereby the container will be constrained against cocking or tilting which would disturb the datum level.

In operation the level functions as follows. The level is taken to the job with the tube 23 coiled about the reservoir 13 and the cover 16 on the container 10, as shown in Figure 3. The lid or cover 16 is first removed as is the reservoir cover 14. One end of the tube 23 is then inserted through the opening 20 in the top plate 18 of the cover 16. The opening 19 will then act as an atmosphere vent for the reservoir 13, as shown in Figure 1. A sufficient amount of tube 23 is passed through opening 20 to enter and pass below the liquid level of the reservoir 13.

By means of a siphoning action liquid is drawn from the reservoir 13 through the hydrostatic tube 23 and following the principle that water seeks its own level the scribe line 24 is used as the remote indication of the liquid level in the reservoir. If the reservoir 13 is of small volumetric content the tube 23 may be filled with liquid prior to its insertion into the reservoir 13 and the drawing of the siphon.

The datum point for the reservoir level may be established by driving a stake 28 having a nail near the top thereof as shown in Figure 1. The large portion of the key hole opening 25 is passed over the nail head 26 and the whole container pushed toward the stake until the nail head clears and the weight of the container may then urge the shank of the nail within the smaller opening.

The leveling is now carried out by the operator holding the free end of the tube vertically against a stake or surface to be marked. When the liquid comes to rest, the operator will scribe a mark and with the tube end covered to prevent spillage, continue the operation at other points.

All level marks thus inscribed will be level with each other, because they are all referred to the same liquid surface in the stationary reservoir. To establish some definite elevation it will be necessary to measure up or down from this line or plane of reference, as is commonly done in engineering practice. For the greatest accuracy the same amount of tubing must be used for each operation.

Upon completion of leveling the tube 23 is drained and the reservoir 13 is sealed by placing the cover 14 thereover. The hydrostatic tube 23 is then coiled about the reservoir 13 and the cover 16 placed upon the container 10. The unit is then ready for transportation or storage until its next use.

Figure 9:
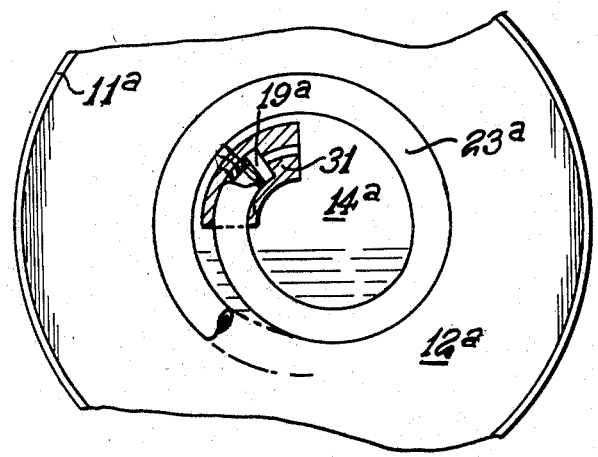
Figure 9 is a fragmentary top plan view of the device of Figure 8.
Figure 10:
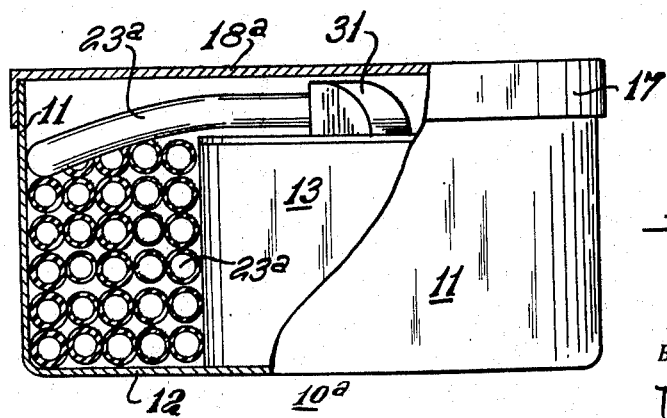
Figure 10 is a side elevational view with parts broken away and parts shown in section of the level of Figure 8 having the hydrostatic tube coiled about the reservoir for transporting.

A modified form of the invention is shown in Figures 8 through 10. In this form of the invention the reservoir 13a is provided with a permanently attached cover 14a. The tube 23a is permanently attached to the bottom of the reservoir 13a by a nipple 30.

The permanently attached reservoir cover 14a is provided with an upstanding boss 31 having a vent opening 19a therethrough communicating with the reservoir 13a. The boss 31 has the vent opening 19a positioned horizontally above the reservoir cover 14a to permit insertion of the free end of the hydrostatic tube 23a therein when the tube is coiled in the container 10a. The diameter of the vent opening 19a is slightly less than the outside diameter of the hydrostatic tube 23a to assure a frictional fit in the vent opening 19a when the unit is not in use as shown in Figure 10. This keeps the liquid in the reservoir 13a or tube 23a and no liquid enters the container 10a. In this form of the invention the container cover 18a does not have any openings therethrough.

Although I have disclosed herein the best form of the invention known to me at this time, I reserve the right to all such modifications and changes as may come within the scope of the following claims.

What I claim is:

1. An improved hydrostatic level comprising a reservoir partially filled with liquid, a long flexible transparent tube containing the same liquid as in the reservoir, having one end open to the atmosphere and the other end communicating with the liquid in the reservoir, a cylindrical container surrounding the reservoir and forming an annular stowage space about it, a cover for the container provided with two identical circular flared apertures so located as to be above the reservoir, the apertures having a diameter slightly less than that of the long flexible tube so as to form a friction fit on the tube in such manner as to hold the tube end in position to communicate with the liquid in the reservoir, which is vented to the atmosphere by means of the other aperture.

2. In a hydrostatic level, a long tube of flexible transparent material containing a liquid, a container for stowing said tube when not in use, and a closed reservoir smaller than said tube container centrally positioned within the container and partially filled with liquid and connected with said tube so that the liquids communicate, said reservoir having a circular aperture above the surface of the liquid with diameter slightly less than that of the said flexible tube so that the free end of said tube can be inserted in a friction fit to form a liquid-tight closure when the level is not in use.

References Cited in the file of this patent

UNITED STATES PATENTS

| | | |
|---|---|---|
| 277,037 | Le Grande | May 8, 1883 |
| 1,703,205 | Pearsons | Feb. 26, 1929 |
| 2,587,998 | Heath | Mar. 4, 1952 |
| 2,641,061 | Schmidt | June 9, 1953 |